Sept. 21, 1954    A. G. BERWICK ET AL    2,689,671
APPARATUS FOR DELIVERING MEASURED QUANTITIES OF LIQUID
Filed Jan. 25, 1951
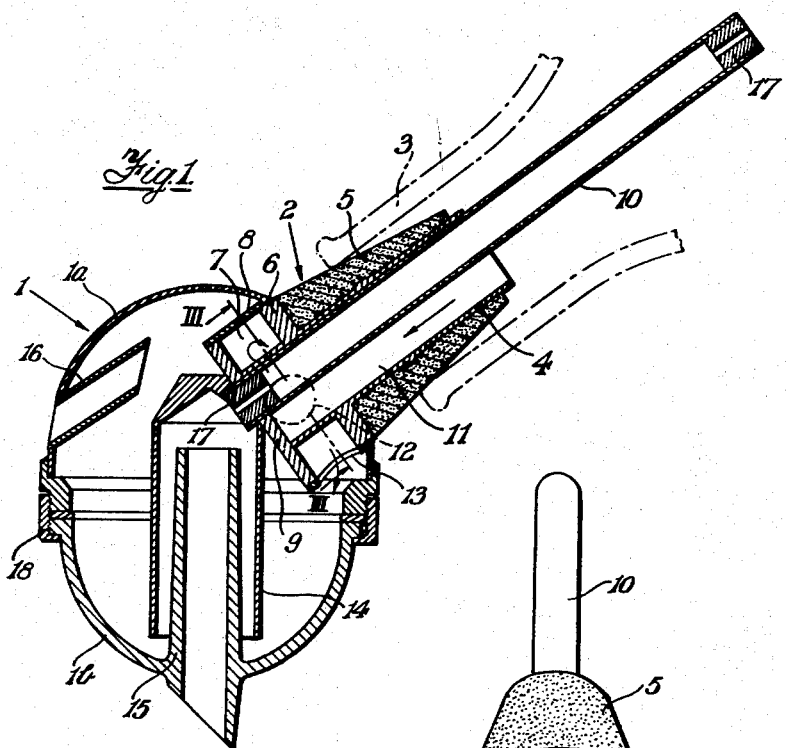
Inventors
ALBERT GEORGE BERWICK
&
WILLIAM RICHARD BERWICK
By
Namers Dickey & Pierce
Attorneys Patented Sept. 21, 1954

2,689,671

UNITED STATES PATENT OFFICE 2,689,671

APPARATUS FOR DELIVERING MEASURED QUANTITIES OF LIQUID

Albert George Berwick and William Richard Berwick, London, England, assignors to Gaskell & Chambers Limited, Birmingham, England Application January 25, 1951, Serial No. 207,706

Claims priority, application Great Britain February 10, 1950

4 Claims. (Cl. 222—416)

This invention relates to apparatus for delivering measured quantities of liquid from bottles and similar containers and more particularly to apparatus of the kind comprising a dispensing or measuring chamber adapted to be mounted on the mouth of a bottle, means for conducting liquid from the bottle into the chamber and for admitting air to replace the liquid delivered from the bottle, and a siphon device for controlling discharge of liquid from said chamber and consisting of a bell enclosing the upper portion of an outlet tube, the arrangement being such that tilting of the bottle causes liquid to run into the chamber until it overflows the top of the outlet tube within the siphon bell whereupon further entry of air into the bottle is prevented, so stopping the flow of liquid into the chamber, whilst simultaneously a siphon action is started to discharge the contents of the chamber through the outlet tube.

In measuring apparatus of the above kind it is necessary to provide venting means in the upper part of the dispensing chamber of a form and in a position to allow the passage of air but to prevent the escape of liquid when the apparatus is in use. To obtain accurate dispensing it has also been found necessary to effect as far as possible a non-turbulent flow of liquid into the dispensing chamber. Heretofore, endeavours have been made to solve these problems by providing various arrangements of partitions and baffles within the dispensing chamber but such arrangements necessitated intricate soldering or like operations.

The object of the present invention is to simplify the construction of apparatus of the character above mentioned, with resultant advantages in manufacture, whilst at the same time maintaining accuracy in the dispensing of measured quantities of liquid.

It is also an object of the invention to provide an improved apparatus which may be readily adapted to the dispensing of different quantities of liquid.

A further object of the invention is to provide a construction which will overcome any tendency to form an air lock in the air supply conduit and which will function efficiently with a wide range of liquids.

According to the present invention the dispensing chamber carries a tubular fitting which is constructed for attachment to the mouth of a bottle or like container and which embodies an air tube the outer end of which is adapted to extend into the bottle and a conduit for conducting liquid from the bottle to the dispensing chamber, the said conduit terminating at its inner end in an enlarged chamber formed in said fitting and through which the liquid flows to discharge through a port at the lower side into said dispensing chamber, and the bell of the siphon device being secured to said tubular fitting with its upper end in communication with the inner end of the air tube. Preferably, the enlarged chamber in the tubular fitting is of annular form and extends around a substantial part of said fitting, said enlarged or annular chamber providing a head or column of liquid above the discharge port during charging of the dispensing chamber to prevent air entering the bottle through the liquid conduit.

Thus with the improved construction, the means for controlling flow of air into the bottle and the discharge of liquid from the bottle are constructed as a single unit which may be fabricated separately and mounted within the dispensing chamber by a one-point attachment.

Reference will now be made to the accompanying drawings which show by way of example one embodiment of the invention and wherein:

Fig. 1 is an axial sectional elevation through the dispensing device in the operative position but with the section through the tubular fitting taken on the line I—I of Fig. 3, Fig. 2 is a front elevation of the device, and Fig. 3 is a cross section through the tubular fitting on the line III—III of Fig. 1.

The device shown comprises a substantially spherical dispensing chamber 1 into the upper wall portion of which is secured the tubular fitting indicated generally at 2, the relative position of these components being such that the device is brought to the operative position shown in Fig. 1 when the bottle 3 to which it is applied is tilted to an angle of approximately 37° to the horizontal. The fitting 2 comprises a cylindrical sleeve portion 4, upon which is mounted a cork 5 for securing the device within the mouth of the bottle, and an integral inner portion or head 6 of larger diameter which is grooved to provide an annular chamber 7 extending around a substantial part thereof, a sleeve 8 being passed over said head and secured thereto to close the annular chamber at its periphery. The ends of the annular chamber are formed by a wall 19 which extends radially across the chamber. The bore of the fitting is closed at the inner end by an end wall 9 which may be integral with the head 6 and passing through said bore and through the end wall is a tube 10 which extends into the bottle to admit air thereto. The air tube 10 is soldered to the sleeve 4, the remainder of the bore forming a liquid discharge conduit 11 which at its inner end communicates by way of a radial port 12 with one end of the annular chamber 7. A port 13 in the sleeve 8 places the other end of the chamber 7 in communication with the interior of the dispensing chamber. Referring to Fig. 3, it will be seen that the ports 12, 13 are on opposite sides of wall 19 adjacent thereto and are so arranged that, when the apparatus is in the operative position, they are located at the lower side of the tubular fitting, the ports being as near together as is conveniently possible in order to provide in the annular chamber 7 a substantial column or head of liquid behind the outlet port during charging of the dispensing chamber from the bottle. This column or head of liquid prevents air from the dispensing chamber bubbling through the liquid conduit 11 and into the bottle while liquid is being discharged from the dispensing chamber, which action would prevent accurate dispensing of the liquid. The bell 14 of the siphon is attached at its upper end to the end wall 9 of the fitting 2 and in such manner that the bell of the siphon is vertically disposed when the apparatus is in the tilted or operative position, the inner end of the air tube 10 passing through the wall of said bell to communicate with the interior thereof. The outlet tube 15 of the siphon extends through the lower wall portion of the dispensing chamber 2 and up into the siphon bell 14 whilst an air vent of known type is provided in the upper portion of the dispensing chamber, said vent including an open ended vent pipe 16 mounted wholly within the chamber and terminating near the top thereof. To secure the fitting 2 to the dispensing chamber, the reduced portion of the fitting is passed through an aperture formed in the wall of said chamber and is then soldered or otherwise sealed to the said wall.

The dispensing device operates as follows:

When the bottle is tilted liquid flows down the conduit 11, through the port 12, around the annular chamber 7 and out through port 13 into the dispensing chamber whilst air displaced from the siphon bell 14 and air flowing up through the outlet tube 15 passes through the air tube 10 and into the bottle. When the liquid in the dispensing chamber overflows the top of the outlet tube 15 it seals off the air supply to the air tube and simultaneously stops the flow of liquid from the bottle to the dispensing chamber. The overflow of liquid into the outlet tube starts the siphon action by which the contents of the dispensing chamber are discharged. When the lower edge of the siphon bell is uncovered, the siphon is broken, air passes up the outlet tube and another cycle of operations commences, these operations being repeated until the bottle is emptied or is returned to a vertical position when liquid remaining in the dispensing chamber will drain back through the tubular fitting into the bottle. Thus it will be seen that there is a controlled flow of liquid from the bottle to the dispensing chamber, the disposition of the outlet port 13 being such that the liquid is discharged downwardly and laterally against the wall of the dispensing chamber thereby reducing turbulence in the chamber and so ensuring accurate dispensing.

It will be noted that with the construction described there is no connection between the outlet tube and the air tube or the means supporting the air tube. Thus, as the amount of liquid dispensed at each operation is dependent upon the height of the upper edge of the outlet tube above the lower edge of the siphon bell, the apparatus can be readily adjusted to dispense an accurate measured quantity of liquid by an appropriate setting of the upper edge of the outlet tube.

The improved construction also provides several other advantages. Conveniently, the dispensing chamber is of spherical shape consisting of an upper wall portion 1a and a lower wall portion 1b, the joint between the two portions being disposed in what is the mid-horizontal plane when the apparatus is in the tilted position. Thus with the siphon centrally disposed in the chamber the outlet tube is located axially of the lower chamber wall portion. This arrangement simplifies assembly in that the lower wall portion may be offered to the upper wall portion in any relative angular position, no specific location of the two parts being necessary. A further advantage which is derived from the location of the joint as above described is that lower wall portions of different volumetric capacity may be united to a standard upper wall portion embodying the tubular fitting whereby apparatus for dispensing different measured quantities may be readily constructed without modification of the liquid and air flow control means.

A further constructional feature consists in so dimensioning and mounting the tubular fitting that substantially the whole of the fitting head is located above the liquid level at which the siphon action starts. With this arrangement there is little or no varying displacement of liquid within the dispensing chamber when the apparatus is tilted through differing degrees and thereby more accurate dispensing is obtained under all conditions.

With apparatus of the character mentioned difficulty has sometimes arisen due to a tendency for an air lock to be created in the air tube preventing repetitive operation of the device. It has now been found that the air lock can be avoided by providing a restriction at each end of the air tube. This may be effected, for example, by inserting into each end of said tube a plug 17 provided with a small axial bore, and apparatus so constructed will be found to be capable of dispensing a wide range of spirits and similar liquids and also water.

It will be seen that the simplicity of construction of the improved dispensing device renders possible its manufacture in a variety of materials. Thus the fitting 2 may be formed of metal by machining or die casting or it may be moulded in plastic or other material. Similarly, the dispensing chamber may be formed wholly of metal, plastic or other suitable material or of a combination of such materials. In the embodiment illustrated the upper wall portion 1a is made of metal, the lower wall portion 1b being of moulded transparent plastic and being clamped to the upper portion by a lock ring 18. The siphon outlet tube 15 may be formed integral with the chamber wall portion 1b as shown or it may be adjustably mounted in said wall portion in which case it provides readily accessible means for varying the distance between the upper edge of said tube and the lower edge of the bell 14 to adjust the quantity of liquid to be dispensed.

Finally, whilst a dispensing chamber of spherical form has been mentioned the invention is not restricted in this respect as the apparatus will function efficiently and provide the same constructional advantages with a dispensing chamber of other shape, for example, it may comprise a cylindrical body, preferably of sheet metal, with circular side plates which may be of transparent plastic or other material.

We claim:

1. An apparatus for delivering measured quantities of liquid from a bottle or similar container comprising a dispensing chamber, a tubular fitting to which the dispensing chamber is attached and which is formed for mounting on the mouth of the container, a conduit in said fitting for conducting liquid from the container to the dispensing chamber, an air tube in said fitting for conducting air to the container to replace liquid delivered, a head portion on said tubular fitting disposed within the dispensing chamber, an annular chamber formed in said head portion, a first port providing communication between said conduit and said annular chamber, a second port through which liquid in the annular chamber discharges into the dispensing chamber, said ports being arranged at the lower side of said head portion when the apparatus is in the operative position, a radially extending wall in said head portion defining the ends of said annular chamber, said ports being adjacent and on opposite sides of said wall whereby liquid flowing through the conduit is caused to flow around the annular chamber before discharging into the dispensing chamber and so provides a head of liquid behind said second port, and a siphon device for controlling discharge of liquid from the dispensing chamber and consisting of an outlet tube extending through the wall of said dispensing chamber, and a siphon bell enclosing the upper end of said outlet tube.

2. An apparatus as claimed in claim 1 further provided with a restriction at each end of said air tube.

3. An apparatus as claimed in claim 1 wherein the dispensing chamber comprises an upper wall portion carrying the tubular fitting and the siphon bell, and a lower wall portion which carries the outlet tube of the siphon, and releasable means for clamping the lower to the upper wall portion.

4. An apparatus as claimed in claim 1 wherein the outlet tube of the siphon is axially adjustable in the lower wall portion of the dispensing chamber, whereby the distance between the upper end of the outlet tube and the bottom of the dispensing chamber may be varied.

References Cited in the file of this patent
UNITED STATES PATENTS

| Number | Name | Date |
|---|---|---|
| 1,862,801 | Payne et al. | June 14, 1932 |
| 2,193,043 | Schneider | Mar. 12, 1940 |
| 2,209,947 | Conrade et al. | Aug. 6, 1940 |